(No Model.) 9 Sheets—Sheet 1.

A. BLACKIE & C. W. SHARTLE.
TWINE BALLING MACHINE.

No. 516,625. Patented Mar. 13, 1894.

Fig. 1.

Witnesses:
J. C. Robison
L. M. Jones

Inventors:
Alexander Blackie,
Charles Wells Shartle,
by John E. Jones,
Attorney (No Model.) 9 Sheets—Sheet 2.

A. BLACKIE & C. W. SHARTLE.
TWINE BALLING-MACHINE.

No. 516,625. Patented Mar. 13, 1894.

Fig. 2.

Witnesses:
J. C. Robison Jr.
L. M. Jones

Inventors:
Alexander Blackie,
and Charles Wells Shartle,
by John E. Jones,
Attorney.

Fig. 3.

(No Model.) 9 Sheets—Sheet 4.

A. BLACKIE & C. W. SHARTLE.
TWINE BALLING MACHINE.

No. 516,625. Patented Mar. 13, 1894.

Fig. 4.

Witnesses:
J. C. Robison
L. M. Jones

Inventors:
Alexander Blackie
and Charles Wells Shartle
by John E. Jones
Attorney.

(No Model.) 9 Sheets—Sheet 5.

A. BLACKIE & C. W. SHARTLE.
TWINE BALLING MACHINE.

No. 516,625. Patented Mar. 13, 1894.

Witnesses:
J. C. Robison Jr
L. M. Jones

Inventors:
Alexander Blackie
Charles Wells Shartle
by John E. Jones
Attorney

THE NATIONAL LITHOGRAPHING COMPANY,
WASHINGTON, D. C.

(No Model.) 9 Sheets—Sheet 6.

A. BLACKIE & C. W. SHARTLE.
TWINE BALLING MACHINE.

No. 516,625. Patented Mar. 13, 1894.

Witnesses:
J. C. Robison Jr
L. M. Jones

Inventors:
Alexander Blackie,
Charles Wells Shartle,
by John E. Jones
Attorney (No Model.) 9 Sheets—Sheet 8.

A. BLACKIE & C. W. SHARTLE.
TWINE BALLING MACHINE.

No. 516,625. Patented Mar. 13, 1894.

Fig. 10.

Witnesses:
J. C. Robinson Jr
L. M. Jones

Alexander Blackie,
and Charles Wells Shartle,
Inventors:
by John E. Jones,
Attorney.

(No Model.) 9 Sheets—Sheet 9.

A. BLACKIE & C. W. SHARTLE.
TWINE BALLING MACHINE.

No. 516,625. Patented Mar. 13, 1894.

Witnesses:

Inventors: Alexander Blackie and Charles Wells Shartle,
by John E. Jones,
Attorney

United States Patent Office.

ALEXANDER BLACKIE AND CHARLES WELLS SHARTLE, OF MIDDLETOWN, OHIO, ASSIGNORS TO THE MIDDLETOWN MACHINE COMPANY, OF SAME PLACE.

TWINE-BALLING MACHINE.

SPECIFICATION forming part of Letters Patent No. 516,625, dated March 13, 1894.

Application filed March 20, 1893. Serial No. 466,854. (No model.)

*To all whom it may concern:*

Be it known that we, ALEXANDER BLACKIE and CHARLES WELLS SHARTLE, citizens of the United States, residing at Middletown, in the county of Butler and State of Ohio, have jointly invented a new and useful Twine-Balling Machine, of which the following is a specification.

Our invention relates to improvements in machinery for winding twine into convenient balls, and it consists in certain novel features of arrangement, construction, and application, as hereinafter fully explained and particularly pointed out in the claims.

In the accompanying drawings, Fig. 4, a plan view of our machine and bobbin-holder; Fig, 5, a broken elevation partly in section (on a larger scale) showing the stop motion devices for automatically throwing out the driving-clutch mechanism to stop the machine as soon as each ball is complete, or in case the twine breaks, or the bobbin becomes empty or spent, the dotted lines indicating the respective positions of the gravitating twine guide and take-up lever and the automatic trip-lever and catch-bar or dog, during the time the machine is in operation; Fig. 6, a detail end elevation of the said catch-bar and a front elevation of the collar or abutment with which the shouldered or hooked end of the said catch bar or dog is shown in operative engagement, the supporting shaft or bar on which the collar is firmly secured being shown in cross section; Fig. 7, a half size, broken detail elevation showing the mechanism for permitting the automatic return of the cam to its original position for beginning a new ball, also the arrangement of the frictional-differential speed devices at their highest speed and showing the manner in which the worm-gear devices are thrown into and out of engagement for both the running and stopping of the cam-shaft; Fig. 8 an elevation of the back of the slotted box-plate seen in Fig. 7 to more clearly show the lug and hook thereon.

A represents the main supporting-frame of the machine. B is a horizontal shaft journaled in the legs $a$, $a'$ of said frame and having mounted thereon a pair of driving pulleys $b$ and $b'$ and a driving disk $b^2$, the said driving pulley $b$ and disk $b^2$, being both keyed to the shaft, and pulley $b'$ loosely mounted thereon, but the latter adapted to be operatively coupled thereto by means of any ordinary clutch-device $b^3$. C is a horizontal shaft mounted in guide-boxes $c$, on the frame above said shaft B, and carrying a coiled expansion-spring $c'$, an abutting collar $c^2$, a pendent fork $c^3$, a collar or projection $c^4$, and a reciprocating or operating lever C', the latter being pivoted or fulcrumed at its lower end on the rear frame leg $a$, and carried or projected forward at its upper end to any point convenient for the operator to handle, in order to throw said clutch. Said expansion-spring $c'$ is placed between abutment collar $c^2$ and the rear guide-box $c$, thus normally thrusting the shaft C forwardly for automatically releasing or disengaging the clutch, controlled in the manner and for the purposes hereinafter fully stated.

B' is a gravitating lever or arm, pivotally mounted at its inner, hubbed end on a short shaft or stud-bolt $B^3$ projecting laterally from the upper part of the main-frame; and $C^2$ $C^3$ are two collars on said shaft $B^3$, between which the said pivotal end of the arm B' is placed, stops or lugs $C^4$ and $C^5$ being constructed on the inner faces of said collars, and similar stops $B^4$ and $B^5$ provided on the opposite sides of said hubbed-end of arm B', for engagement with said stops $C^4$ and $C^5$ respectively, as hereinafter fully described.

A' is a grooved pulley or sheave journaled at the outer end of a short lateral shaft projecting from the outer end of arm B', and over which sheave the twine runs in passing from the bobbin or other supply to the flier and winding or balling spindle.

$A^2$ is a lower extension or curved branch constructed on the arm B', and suitably thickened or weighted at its end $A^3$ to facilitate the gravitating-force of said arm B'.

D represents a forwardly disposed lever or arm journaled on pin $d$, which projects laterally from the upper part of frame A, slightly lower than said journal of the gravitating-arm B'; and D' is a rearward extension or short arm on the arm D, for receiving the lower extension $A^2$ of the gravitating-lever B', on the release and fall thereof, as hereinafter stated. $D^2$ represents a horizontal dog or hook, journaled at $D^{21}$, at one end on the frame just below said arm D, and provided with a pendent tooth or lug $d'$ at its outer end which engages the flattened upper periphery of the collar $c^4$, to hold the shaft C back against the pressure of spring $c'$ and the clutch-devices in operative-contact.

Figures 5, 6:
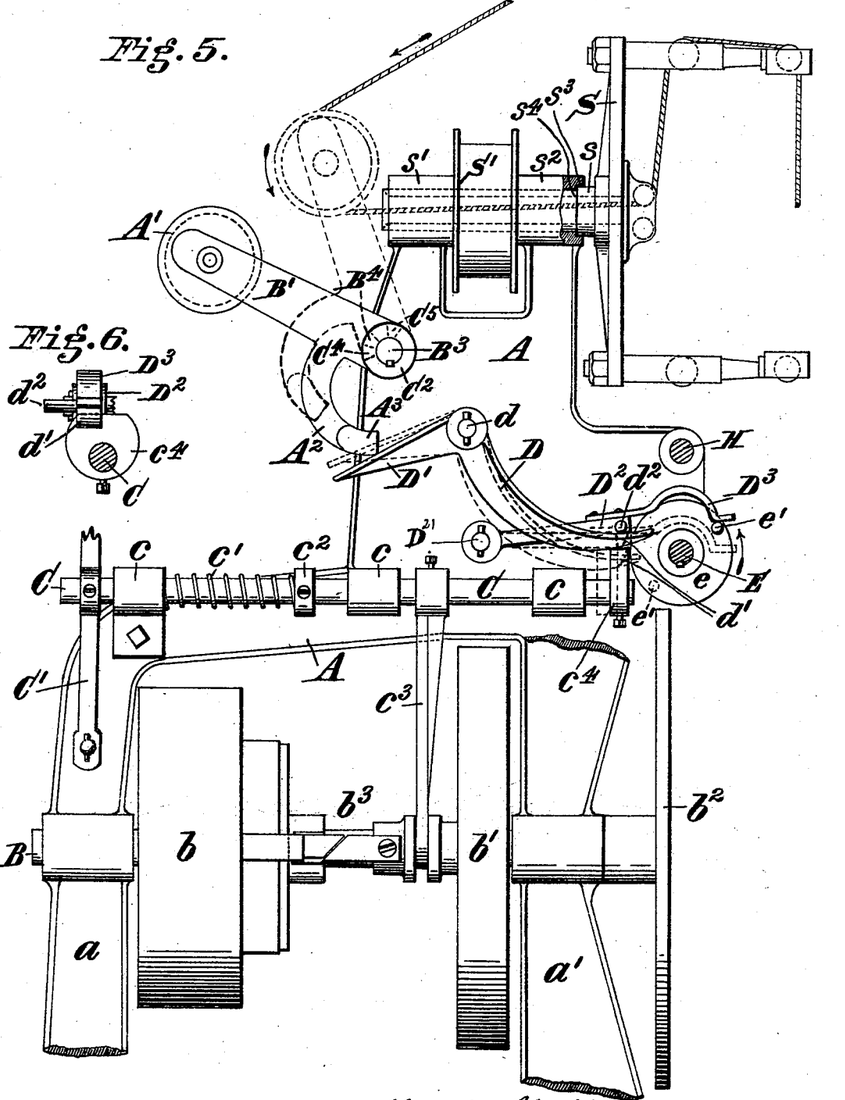

$D^3$ is an arched-extension on the outer end of the dog $D^2$, and $d^2$ a lateral pin on said dog just above its tooth $d'$ and provided for the lifting-engagement thereunder of the free end of the lever D, all as best seen in Figs. 5 and 6.

E represents a longitudinal shaft journaled in the forwardly projecting U-shape top portion $A^4$ of the main frame, at right angles to shaft C, in a plane slightly above the latter, and having a disk $e$ keyed thereto adjacent to said dog $D^2$; and $e'$ is a pin projecting laterally from the disk $e$ for raising or lifting engagement with the outer end of the arched-extension $D^3$ of said dog. E' is a spur-gear keyed to shaft E to the left of said disk $e$, leaving proper intervening space for said dog; and F is a narrow winding drum or pulley mounted fast on shaft E and having a weight $f$ suspended therefrom by means of a winding-strap $f'$.

G represents a disk keyed upon the outer end of shaft E, (to the left, see Figs. 3 and 7,) and also provided with a lateral pin $g$, like unto the said disk $e$ having pin $e'$ on the same shaft, both disks forming essential parts of our automatic stop-motion devices.

Figures 7, 8:
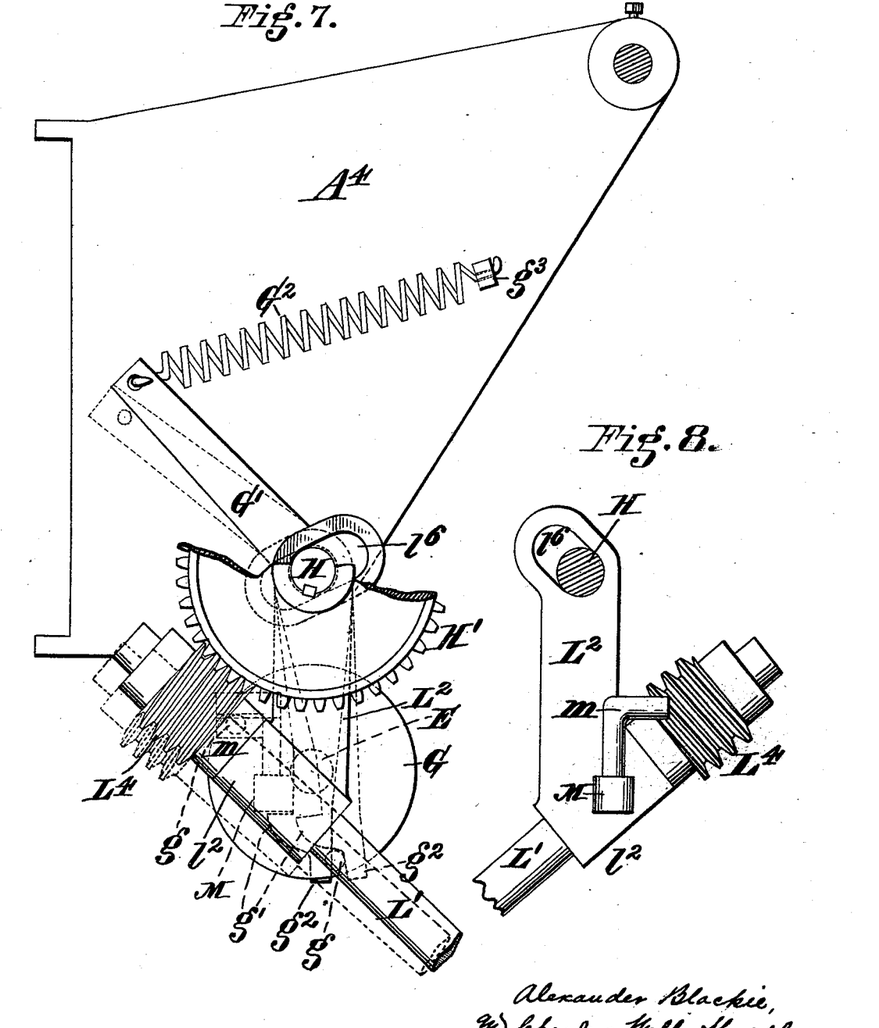

G' represents a trip lever or dog loosely journaled, between ends, on the cam shaft H, the latter in turn being journaled in boxes $h$, $h$, forming part of the said U-shape frame $A^4$, and lying parallel to said shaft E, a suitable distance above the latter. The lower end of the lever or dog G' is provided with a tooth or hook-projection $g'$, and a short extension $g^2$, the latter being engaged by said pin $g$ on disk G, in the operation hereinafter fully described. The upper end of dog-lever G' is provided with a retractile or tension spring $G^2$, one end of which is hooked thereto, and the other suitably fastened to a projection $g^3$ on the outer face of said U-frame $A^4$, as best shown in Fig. 7.

H' represents a worm-wheel keyed upon the outer end (to the left, see Figs. 3 and 4), of the cam-shaft H; and $H^2$, is an irregular-cam keyed to the same shaft near its other end.

$h'$, $h'$, represent narrow winding drums or pulleys mounted fast on cam-shaft H, at either side the center thereof, and each having a chain $h^2$ suspended therefrom, the purpose thereof being presently described.

Figure 3:
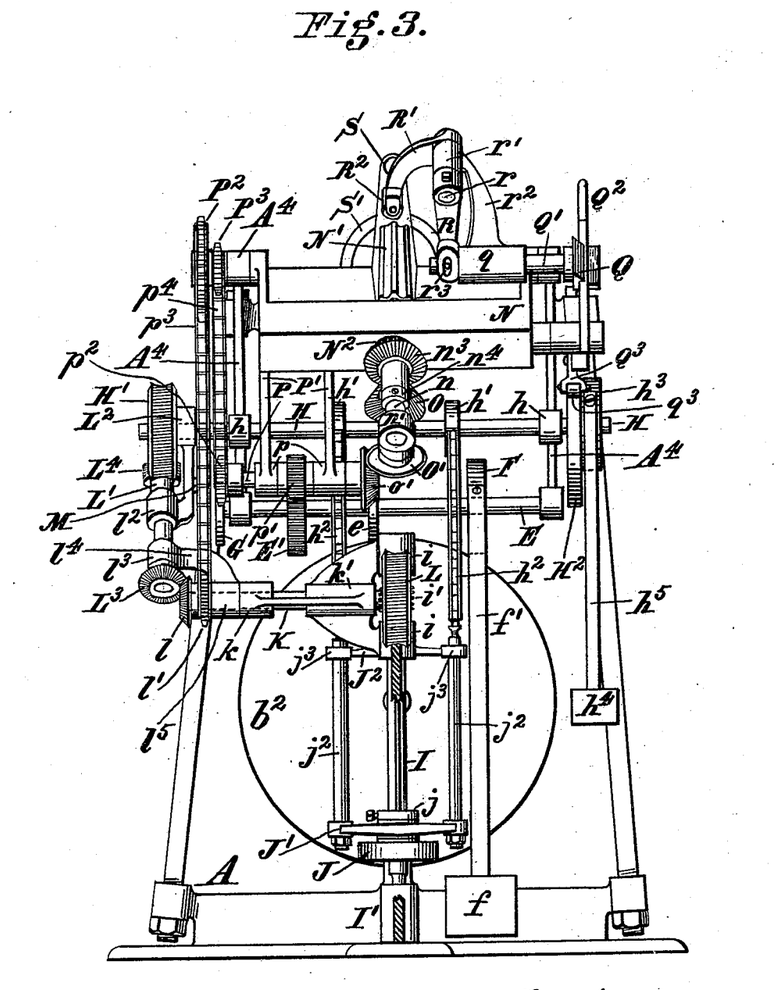
Fig. 3, a front elevation of the same, but omitting the said bobbin-holder.

$h^3$ is a narrow winding-drum keyed upon the outer end of cam-shaft H adjacent the cam $H^2$, and having a weight $h^4$ suspended therefrom by means of a strap or belt $h^5$, all as best seen in Fig. 3.

I represents a vertical shaft stepped at its lower end in the base I' of the main-frame, and journaling at its upper end in boxes $i$, $i$, the latter forming part of a cluster of boxes cast integral and located in front of the driving-disk $b^2$, as clearly seen in Fig. 3. $i'$ is a worm on shaft I, between its said two upper bearings, $i$, $i$, and J is a friction disk or pulley feathered on said shaft I, with its face closely engaging the front face of said driving-disk $b^2$, for intimate driving-contact therewith.

J' is a horizontal cross-head on the upper hub or flange of the friction-pulley J, the said hub being passed there-through and coupled therewith by means of a collar $j$, which latter is secured to the upper end of said hub. $j^2$, $j^2$, are vertical side bars or rods projecting upwardly from the opposite ends of said cross-heads J', and taking through guide-eyes or boxes $j^3$, $j^3$, constructed in the opposite ends of a pair of lateral bars or arms $J^2$ projecting from the lower box $i$ of said upper bearings. Arms $J^2$ with their side-guides $j^3$ are arranged parallel to and in a line above said cross-head J', being quite similar to the latter, and the upper ends of the side-bars are hooked or otherwise connected to the said chains $h^2$ suspended from the winding-drums $h'$, $h'$, on the cam-shaft.

K is a short horizontal shaft journaled in boxes $k$ and $k'$, which both form part of said cluster of boxes in front of the driving-disk $b^2$ (see Fig. 3), and L is a worm-wheel keyed to the inner end of shaft K and engaging said worm $i'$ on the shaft I for proper rotation.

$l$ is a bevel-gear keyed to the outer end of shaft K, and $l'$ a small sprocket-wheel or pinion, also fast on said shaft K adjacent to the bevel-gear $l$.

L' is an inclined-shaft journaling in bracket-box $l^2$ and box $l^3$, said bracket-box $l^2$ and its shaft L' being pivotally mounted on shaft K by means of said box $l^3$, connecting-web $l^4$, and the box $l^5$, (see Fig. 3,) and the box $l^2$ constructed integral with an upright plate or bar $L^2$, the latter having an inclined-slot $l^6$ in its upper end which freely engages the cam-shaft H, as best seen in Figs. 7 and 8.

$L^3$ is a bevel-gear keyed at the lower end of inclined shaft L', and meshing with the bevel-gear $l$ on the shaft K, and $L^4$ is a worm constructed at the upper end of said shaft L', and engaging the worm-wheel H' on the cam-shaft for driving the latter.

M represents an enlargement or lug on the back or inner face of said upright-plate $L^2$, and $m$ a hook or bent-arm projecting from said lug, as best seen in Figs. 7 and 8, the lug being provided for engagement thereunder of the hooked-end $g'$ of the spring dog-lever G', and said hook $m$ being adapted for engagement thereunder of said pin $g$ on the disk G, to hold said inclined-shaft L' with its worm into proper driving-engagement with the worm-wheel H' on the cam-shaft.

Figure 4:
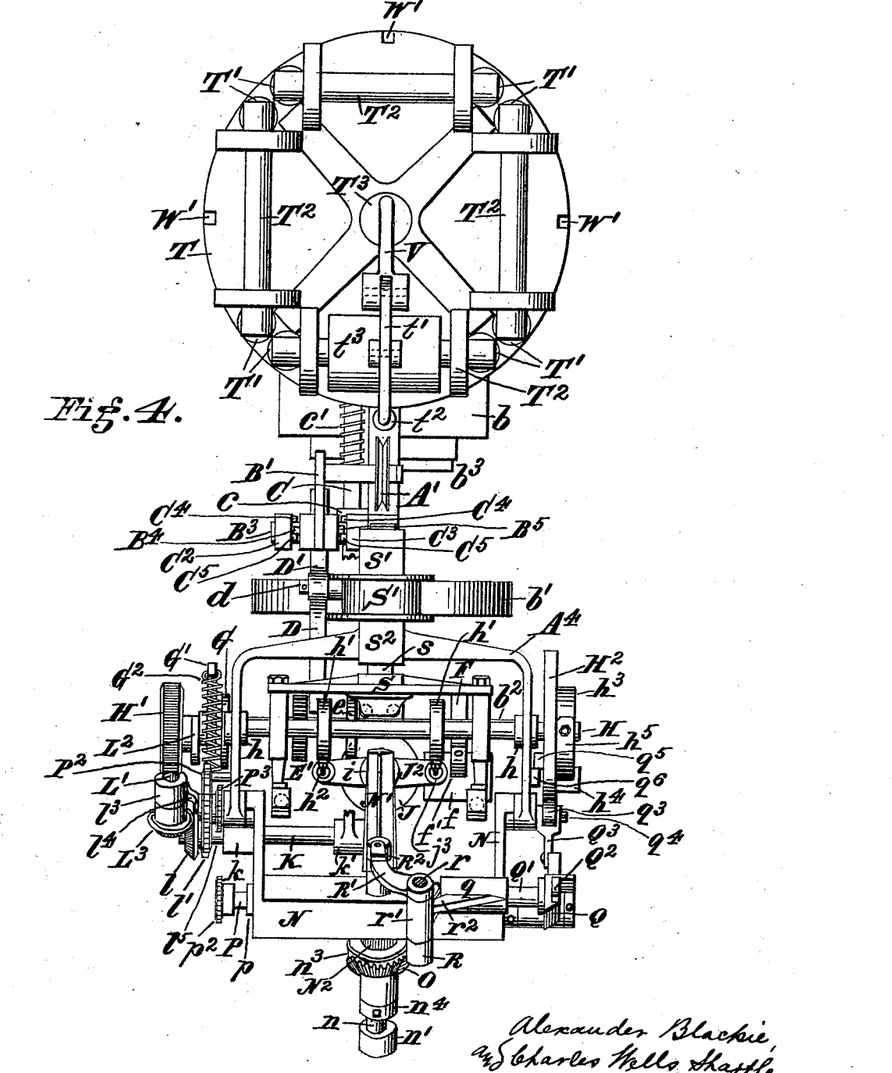
Figure 9:
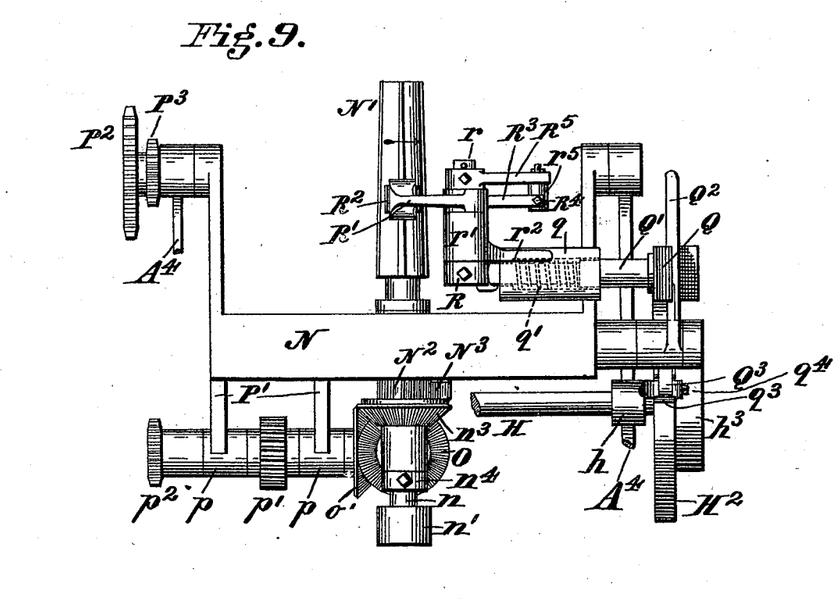
Fig. 9 a detached elevation looking from the front thereof, of our spindle rail or rock-frame showing the automatic clutch and ball sizing or conforming devices thereon.

N represents a U-shape swinging rail or frame having an axis at both its ends in the upper, outer ends of the said U-portion A of the main-frame, as best seen in Figs. 3, 4, and 9; and N' is the usual ball winding-spindle of which there may be one or more journaled in said swinging-frame, with its lower end or arbor $n$ projecting outwardly therefrom, and bearing in a box $n'$ constructed at the outer end of a web or spider $n^2$, the latter being projected from the bottom of said rail N in line with the spindle.

$n^3$ is a bevel-gear mounted loose on arbor $n$, and $N^2$ a ratchet-wheel keyed to the spindle-arbor intermediate the swinging-frame and said bevel-gear $n^3$.

$N^3$ is a pawl on the upper flange or hub of the bevel-gear $n^3$, and $N^4$ a spring, also mounted on said bevel-gear hub, and exerting its pressure on said pawl to hold the latter in proper engagement with the teeth of the ratchet $N^2$, thus loosely coupling the spindle with the driving bevel-gear $n^3$, and permitting a forward turning of the spindle in event the twine breaks or the bobbin runs out, and resetting said spindle at the proper place for continuing the winding-operation without the necessity of running the entire machine which has hitherto been requisite.

A safety collar or stop $n^4$ is fastened to the spindle-arbor, to prevent any accidental or other longitudinal play thereof, or of the bevel-gear $n^3$ thereon.

O and O' are bevel-gears mounted fast at either end of a short shaft journaled in box $o$ constructed in said web $n^2$, the former (O) meshing with said spindle-bevel $n^3$, and the bevel O' engaging a bevel-gear $o'$ keyed to the inner end of a short longitudinal shaft P, the latter being journaled in bearing-boxes $p, p$, at the outer ends of hanger-arms P', P', projecting downwardly at an inclination from the main-rail of said swinging-frame.

$p'$ is a small spur-gear or pinion keyed to shaft P, between the boxes $p, p$, and provided for engagement with the spur-gear E' on the shaft E hereinbefore described, the purpose being fully hereinafter described in connection with the operation of the machine.

$p^2$ is a small sprocket-wheel fast on the outer end of shaft P; and $p^3, p^4$, are two drive-chains, the chain $p^3$ running over the said small-sprocket $l'$ on the shaft K and a large sprocket-wheel $P^2$, and the chain $p^4$ running over the said small-sprocket $p^2$ and a sprocket $P^3$, the latter being the same size as the one $p^2$, and both said sprockets $P^2$ and $P^3$ loosely mounted on a stud or pin projecting from the outer end (to the left Figs. 3, 4 and 9 and to the right in Fig. 11) of the U-frame $A^4$, which also forms at its inner end an axis for one end of the said swinging-rail.

Q represents a grip-socket or clutch at the outer end of a reciprocating shaft Q', the latter being mounted in a guide-box or bearing $q$ which is constructed on the side-arm of the swinging-frame but disposed longitudinally with said swinging-frame, and $q'$ is a coiled-spring around shaft Q' within the box $q$, the shaft being shouldered or flanged to receive the outward pressure or expansion of said spring to project the said clutch Q forward, (as best seen in Fig. 9).

Figure 2:
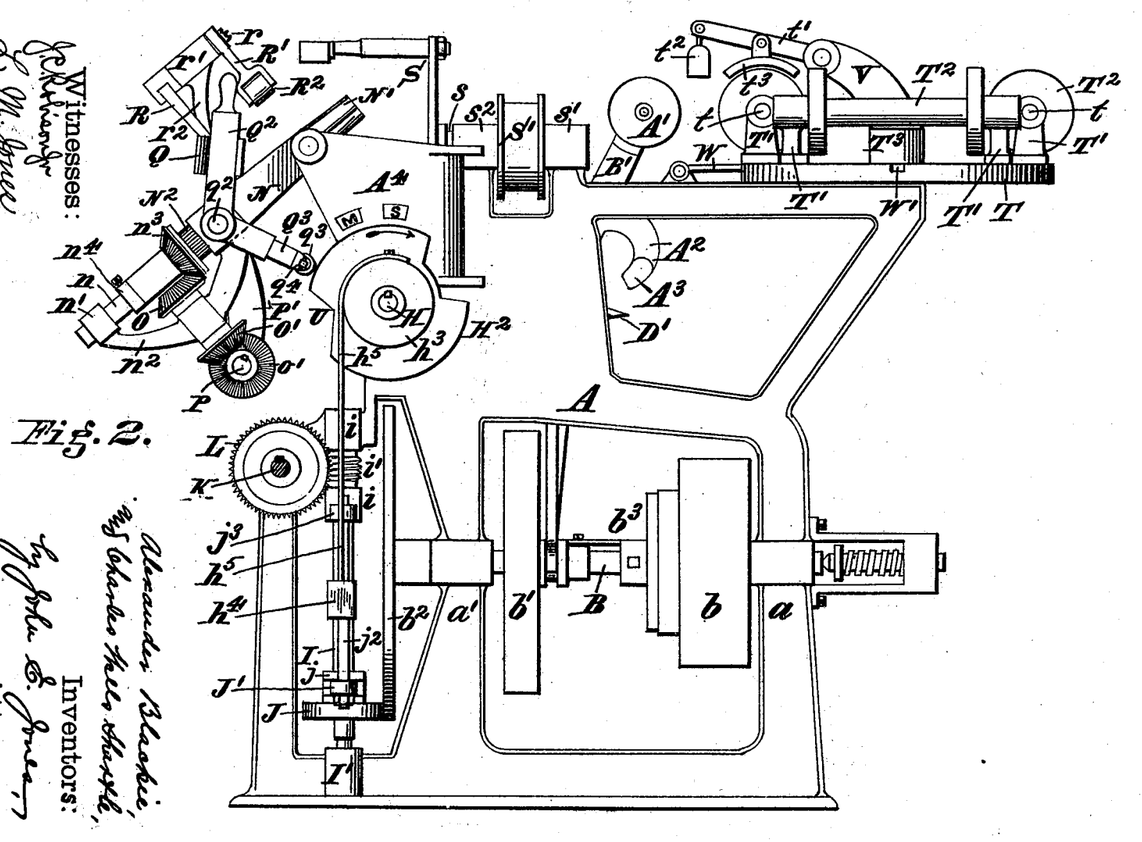
Fig. 2, a view similar to Fig. 1, but of the opposite end.

$Q^2$ is a lever fastened to a wrist-pin $q^2$ on the outer end of said swinging-frame and provided for the proper interlocking-engagement therewith of the clutch Q, the forwardly-actuating spring of the latter causing a positive locking-engagement during the time the ball is being wound until it approaches completion ready for its final layer or cover, hereinafter described in the operation. $Q^3$ is an extension or arm at the lower end of said clutch-lever $Q^2$, and $q^3$ a small wearing roller or trundle preferably rigidly mounted in the forked, outer end of said extension-arm $Q^3$ for frictional-engagement with the irregular face of said cam $H^2$. The mounting of said roller is such that when it has become worn from contact with the cam, a new place thereon may be presented to the cam until it has been so worn on all sides as to be inaccurate and unfit for further use. A square-shanked pin or bolt $q^4$ is passed through the said fork and roller, to properly secure the latter in position (as best seen in Figs. 2, 10, and 11).

Figure 10:
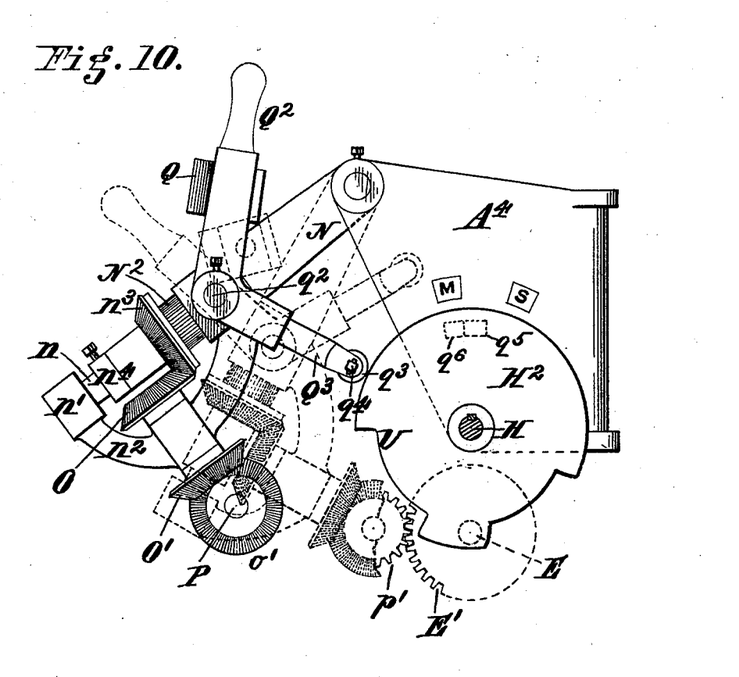
Fig. 10, an end elevation showing the said cam and automatic clutch and ball conforming devices in both their engaging and disengaging positions, the latter indicated by dotted lines.
Figure 11:
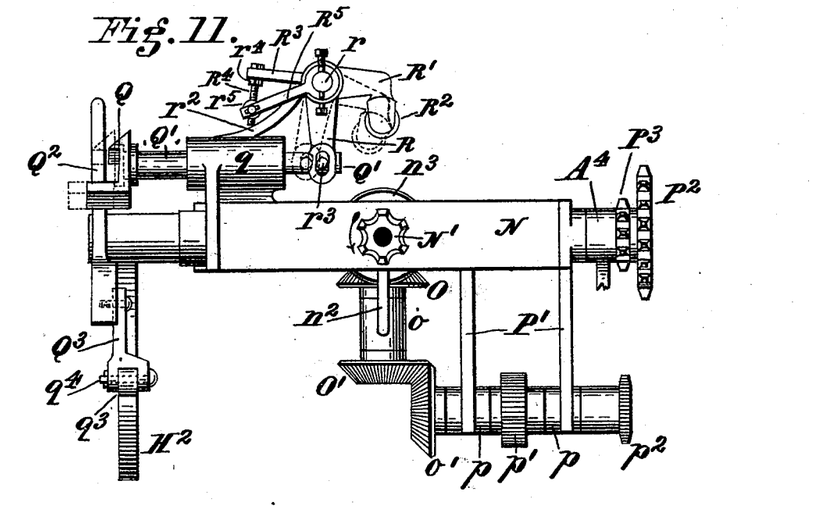
Fig. 11, a detached plan view of our spindle rock-frame and the clutch and conforming devices seen in Fig. 9, but looking from the rear, the dotted lines indicating the position of said clutch and conforming devices at the beginning of a ball-winding operation.
Figure 12:
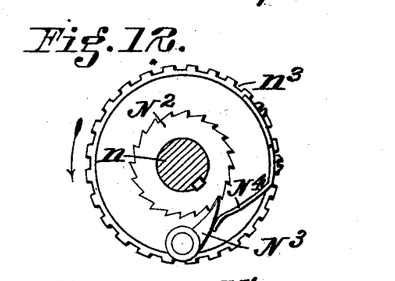
Fig. 12, a detail sectional plan of our ratchet-spindle, upon which the ball is wound, and adapted to be conveniently turned forward without affecting the operation in case the twine breaks at any time in the winding thereof.
Figure 13:
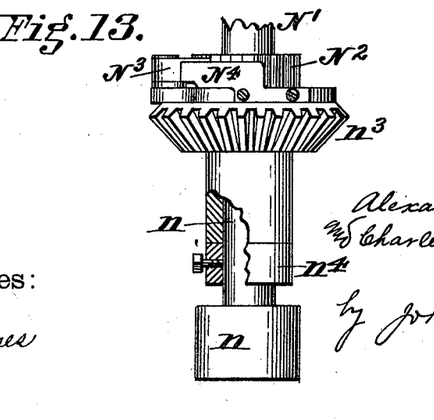
Fig. 13, an elevation partly in section of the ratchet-spindle device seen in the previous figure.

$q^5$ is a stop or lug on the back or inner face of cam H'; and $q^6$ a detachable stop on the adjacent face of the U-frame $A^4$, (as best seen in Figs. 4 and 10,) the two comprising a suitable gage-device by which the said cam is properly caught after each operation, to suit the kind of twine being balled, the stop $q^6$ being adapted to be screwed into threaded-openings in the frame beneath the indicator-letters M and S (meaning manila and sisal).

R is a crank-arm or lever whose inner end is fast on one end of a short shaft $r$, the latter being journaled parallel to the spindle, in a box $r'$ which is constructed on a web or arm $r^2$ projecting from the clutch-lever box $q$. The outer end of said crank R is slotted both longitudinally and laterally to receive the inner end of the clutch-shaft $Q'$, which latter is suitably coupled thereto by means of a cross-pin $r^3$, freely engaging said lateral slots to constitute a swivel-joint. R' is a bent-arm or crank whose inner end is journaled loosely on said shaft $r$, at the end opposite to that occupied by crank R, and provided with a roller or trundle $R^2$, journaled in its outer forked end, (as seen in Figs. 1, 2, 3, 9, 10, and 11.)

$R^3$ is a rearward extension or arm on the hub of roller-crank R'; and $R^4$ a screw-threaded pin or bolt projecting laterally from the rear end of said extension $R^3$. This pin $R^4$ is passed through a threaded-opening in said extension, and has a jamb-nut $r^4$ by which it may be adjustably set in position to suit the desired size of ball to be wound in the machine.

$R^5$ is an arm, fast on said shaft $r$, outside the hub of crank R', and provided at its outer end with a swivel $r^5$ having a threaded-opening to accommodate the threaded-bolt or pin $R^4$ aforesaid, and thereby couple said crank R' to the shaft in the proper relative angle with crank-arm R to suit the size of ball to be wound.

S represents an ordinary flier whose hollow arbor or shaft $s$ is journaled in the boxes $s'$, $s^2$, constructed at the top of the U-frame $A^4$, (as best seen in Figs. 1, 2, 4, and 5,) the box $s^2$ being preferably shouldered or countersunk at its outer end $s^3$, to accommodate a shoulder or flange $s^4$ on the said flier-shaft S, (as best seen in section, in Fig. 5,) the arrangement and purpose of the said shoulder on the shaft and its seat $s^3$ in the box, being to allow sufficient space (somewhat greater than the thickness of the twine) between the flier and the adjacent outer edge of said box $s^2$ and correspondingly maintain the flier at a suitable distance from the bearing-box and frame, to positively prevent the locking or clogging of the twine between said parts, (the flier and box $s^2$), should it become broken or loose from the flyer in the winding-operation.

S' is a pulley keyed to the flier-shaft, between its journal boxes $s'$, $s^2$, and over which runs the driving-belt (not shown) from pulley $b'$, on the shaft B aforesaid.

Figure 1:
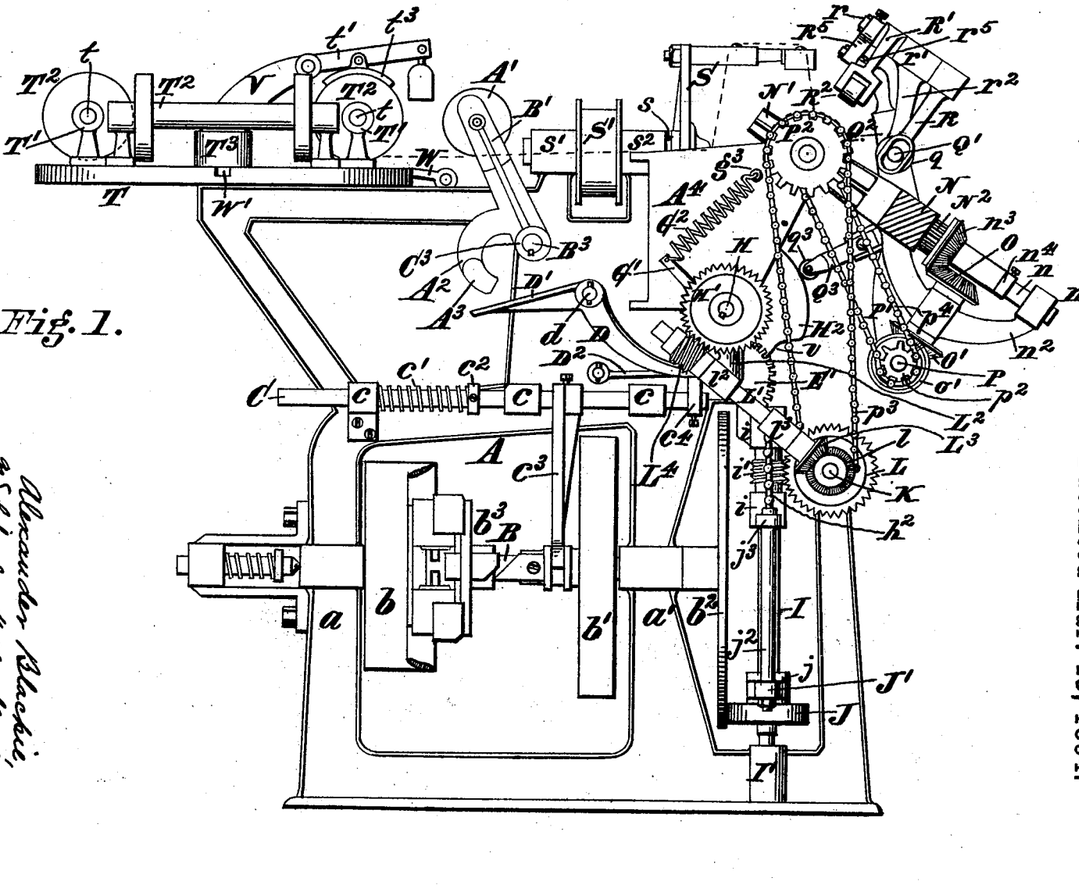
Figure 1 is an elevation of one end of a one-spindle machine showing the parts in the position they assume at the beginning of a ball-winding operation, a suitable bobbin holder or reel device for containing and presenting the twine to be balled being shown mounted on an extension back-frame.

In Figs. 1, 2, and 4 we have shown a suitable holder for the feeding-twine, and constructed thus: A turret or turn-table T is pivotally mounted on a rear extension of the main-frame, and carries along its edge a series of four pairs or sets of upright bearing-posts T', between each pair of which bearings, a bobbin or spool $T^2$ is journaled on suitable shafts $t$, the latter being in turn journaled or mounted in said posts T'.

$t'$ is a brake-arm pivoted at its rear end upon a bearing-arm or support V, the latter projecting forwardly form the stationary central pivot $T^3$ of the turret, and said brake-arm having a brake-shoe $t^3$ pivoted thereto, and a suitable weight $t^2$ at its outer end, to exert the desired tension or pressure on the twine direct while on the feeding-bobbin, the said twine passing from under the bobbin to the balling-devices. A suitable catch-bar or latch W is pivotally mounted on the main-frame adjacent the turn-table, the latter being provided with notches or sockets W', into which the said latch may be conveniently and readily dropped for locking engagement therewith when the turret is in proper position with a filled-bobbin in line for feeding-presentation to the machine, and just as readily raised for disengagement from the turret when it is desired to turn the latter, and presenting a fresh or full bobbin.

In the operation of the machine, the twine is fed from the bobbin, under the pulley A', thence it proceeds through the hollow flier-shaft to the flier-legs; thence to the winding-spindle. The clutch shaft C, being forced backward against the pressure of its spring $c'$, places the clutch-devices in operative engagement with the driving-pulley $b$, thereby setting the flier and spindle in motion, said flier being driven by means of a belt (not shown) passing over the pulleys $b'$ and S', and said spindle driven or rotated by means of driving-disk $b^2$, which turns the contacting friction pulley or disk J, the latter turning the shaft I whose worm $i'$ engages and turns the worm-wheel L on the shaft K. The bevel-gear $l$ on shaft K meshes with bevel-gear $L^3$ and turns the inclined-shaft L', the worm $L^4$ on the latter engaging and turning the worm-wheel H' on the cam-shaft H. Chain $p^3$ communicates motion from sprocket $l'$ on shaft K to the larger sprocket $P^2$ and its accompanying small-sprocket $P^3$; and chain $p^4$ communicates motion from said sprocket $P^3$ to the small-sprocket $p^2$ on shaft P, to drive the latter at the desired speed. The bevel-gear $o'$ on shaft P meshes with bevel O' on a suitable shaft, which latter has another bevel O meshing with the bevel $n^3$ on the spindle-arbor. The rotation of the cam-shaft causes its drums $h'$ to wind up the chains $h^2$, thus elevating the vertical-rods $j^2$ and cross-head J, together with the friction-disk J, the latter gradually approaching the center of the driving-disk $b^2$, which action causes said disk J to gradually decrease in velocity to suit the gradually increasing diameter or size of the ball. The drum $h^3$, at the outer end of said cam-shaft, is simultaneously winding up the suspension-strap $h^5$ of the weight $h^4$, and the cam $H^2$ is rotating, with the lower end of the clutch-lever arm $Q^3$ bearing against it. The shape of the cam is such that the balling-spindle makes a certain desired number of revolutions, (which varies in accordance with the kind of twine to be balled, say, for instance and comparison, about three revolutions for manila, and two for sisal,) during the first portion of its rotation after leaving the stop or abutment $q^6$ on the stationary-frame, until the depression U is reached. The ball now having its foundation is ready to go to the desired form, and the presser-arm $Q^3$, which bears against said cam, now gradually rides or drops into said depression, thereby lowering the swinging-frame N on its axis and arranging the spindle at the angle at which it should lie to suit the said desired form of ball, and, as the cam progresses and the ball increases in diameter, and approaches the desired size, the depression U ceases and the said arm $Q^3$ rides upward upon a higher plane, (about that it first rode upon.) It will be seen from the above that the shape or track of the cam and the engagement therewith of the rail clutch-arm $Q^3$, properly and at all times determine the angle of the spindle, and the shape of the ball to be made in the machine. As the ball increases and approaches the desired size it reaches the roller in the spring-controlled roller presser-arm R', bearing in line therewith, and forces said roller-arm R' outwardly, simultaneously drawing the clutch-shaft Q' inwardly and slowly releasing the clutch Q from the lever $Q^2$. As soon as the grip or clutch Q is entirely free from the trip-lever $Q^2$, the cam, by reason of its intimate contact with the end $q^3$ of said trip-lever $Q^2$, throws the latter which in turn entirely releases the spindle-rail or frame N, so that the latter swings or drops on its axis, and somewhat alters the pitch or angle of inclination of the spindle in relation to the flier, to perform the final function of putting the last layer or cover on the ball. On the said dropping of the spindle-rail the active, small spur-gear $p'$ thereon, immediately engages the heretofore still spur-gear E' and thereby actuates shaft E on which said latter gear E' is mounted. During the revolution of this shaft E, its drum F winds the suspended-weight $f$ and the disks $e$ and G turn until their pins $e'$ and $g$, respectively, come into contact with the arched-extension $D^3$ on dog $D^2$, and the lower extension $g^3$, on the trip-lever or dog G', the striking-contact of the said pin $e'$ with said dog-extension $D^3$ causing the hooked-end $d'$ on said dog to rise and become entirely free from engagement with the collar $c^4$ on the shaft C, and the latter being automatically thrown forward by its expansion-spring $c$ thereby actuates the fork $c^3$, which in turn throws the clutch $b^3$ to disconnect the power and stop the machine. The striking-contact of said pin $g$ on disk G, is simultaneous with that of said pin $e'$, and when said pin $g$ abuts the lower end $g^2$ of the lever or dog G', the tooth $g'$ of the latter is freed from engagement with the lug M on the back of the box-plate $L^2$, thereby permitting the inclined worm-shaft L' with its upper supporting box-plate $L^2$ to drop or swing downward the length of the slot $l^6$ in said box-plate $L^2$, sufficient for the worm $L^4$ to become entirely clear from operative-engagement with the worm-wheel H' on the cam-shaft. Thus, with the presence of the two disks $e$ and G, the power is disconnected and worm-shaft L' freed from contact with the cam-shaft simultaneously, and the ball is finished ready for its removal from the spindle. After the ball is removed, in order to reset the machine for operation on succeeding balls, the spindle-rail is raised or swung upward on its axes or hinges, and the trip-lever $q^2$ brought into engagement with the clutch-grip Q. Simultaneously and coincident with the disengagement of said worm-shaft L' from worm-wheel H', the cam-shaft runs free, and returns to normal position ready for operation, the unwinding or dropping-movement of the weight $h^4$ on the outer end of said cam-shaft performing said returning-action thereof, and also unwinding the chains $h^2$ from drums $h'$ to allow the friction-disk J and its lifting-frame to drop by gravity, (which exceeds the frictional resistance of the disk J against the driving-disk $b^2$,) to return said disk J to its lower position for high-speed engagement with the said disk $b^2$. As the swinging-rail is raised, the spur-gear $p'$ becomes free from the spur-gear E' and the shaft E instantly rotates backward by reason of the unwinding of weight $f$ from drum F, the two disks $e$ and G being thereby returned to normal position, and the pin $g$, on said disk G, having thus left the lower end $g^2$ of the trip-lever or dog G', is also forcibly brought into active lifting-engagement thereby with the hook or projection $m$ on lug M of the slotted box-plate $L^2$, raising the worm-shaft L' into normal re-engagement with the worm-wheel H on the cam-shaft. As the disk G returns to normal position, the lower tooth or hooked portion $g'$ of the dog G' advances or follows with it, owing to the retractile or contracting power of spring $G^2$, and said tooth $g'$ engages under said lug M, to properly hold said inclined worm-shaft in contact with said worm-gear on the cam-shaft during the entire operation of winding a ball. It will be seen that the gravity of weight $f$ bringing the pin $g$ on disk G firmly against said hook $m$ on the box-shaft suspension-plate $L^2$, also serves to hold said worm-shaft L' against the worm-wheel H', and thus the two last-named supporting-devices for said worm-shaft doubly insure its proper engagement with the worm-wheel on the cam-shaft. The machine is readily started by throwing the clutch into engagement, a convenient means being that partly shown in Fig. 5, in which the lever C', (which may have an arched-arm or handle projecting forwardly over the machine, convenient for the operator in front, but not shown,) is pushed backward, thereby drawing the shaft C rearward and compressing the spring $c'$. As the shaft C is drawn rearward, its collar $c^4$ rides freely under the tooth $d'$ on the dog $D^2$, and then as soon as said tooth is cleared, the dog drops and rests on said collar with the latter bearing against said tooth by the expansive-action of said spring $c'$.

In case the twine breaks or runs out the supply-bobbin during a winding-operation before a ball is complete, we provide the auxiliary automatic stop-motion devices whose construction is hereinbefore described, and whose operation we will now mention. While the twine is normally feeding into the machine as shown in Fig. 5, the gravitating-lever or arm B' assumes its upward position, (see dotted lines,) and exerts and supplies a suitable tension and take-up for said feeding-twine. Should said twine break or become spent the said gravitating-lever instantly falls and the blow or striking-contact of its weighted lower-extension $A^2$, on the rearward-extension D' of the trip-lever D, instantly raises the latter which in turn engages the pin $d^2$ on the dog $D^2$, and raises said dog $D^2$ from engagement with the clutch-operating shaft C, the latter, (shaft C,) automatically throwing or releasing the clutch $b^3$ (or other desired similar driving-mechanism coupling), which stops the machine at once. The two collars $C^2$ and $C^3$ on the lever-shaft $B^3$, are provided with stops or lugs $C^4$ and $C^5$, and the hub of the gravitating-arm B' is also provided with similar stops $B^4$ and $B^5$, as aforesaid, the purpose of both said sets of stops being to limit or adjust the movement of said arm B' in either direction, that is, so that it shall not fall any lower than necessary, or rise more than necessary, to come into too close interfering contact with the flyer arbor, or the adjacent machine-frame.

We elevate the lower-extension $A^2$ of the gravitating-lever some distance above the trip-lever arm D' when the machine is in operation, so that the weighted lower end thereof shall have fall sufficient to strike said trip-arm D' a good blow to insure the release of the dog from the catch or clutch-collar $c^4$, aforesaid.

The construction of the bobbin-turret is so simple and hereinbefore clearly described that a further description thereof as to its operation, would be superfluous.

We claim—

1. In a machine for balling twine and other fibers, the combination with a rotary-flier having a hollow arbor or spindle, of a shoulder or flange $s^4$ constructed at the inner end of said arbor adjacent the flier cross-head, and a journal-bearing having a countersink or shoulder $s^3$ forming a recess or seat at the inner end of said journal-bearing for said shouldered portion of the arbor, whereby the flier is maintained at a suitable distance from the bearing and frame, the intervening space between the flier and bearing-box and the joint formed by said shoulder being such as to preclude any locking or catching of the twine therein should the latter break or become loose from the flier in the winding operation, substantially as herein set forth.

2. In a machine for balling twine and other fibers, the combination with a suitable frame provided with a ball winding spindle, a canting device, a rotary flier and driving mechanism, of a driving-disk $b^2$ actuated by said driving mechanism, a friction-disk J engaging said disk $b^2$, a rising and falling frame supporting said disk J and presenting it radially along the driving-surface of disk $b^2$, for varying the velocity of disk shaft I, shaft I having a worm thereon, a worm-wheel and shaft engaged by said worm and a bevel-gear and driving-sprocket on said worm-wheel shaft, whereby motion is communicated to the ball winding-spindle, actuating and canting devices, substantially as herein set forth.

3. In a balling-machine, the combination with a rotary driving-disk $b^2$ mounted in a suitable frame, of a friction-disk J having varying-speed connection with said disk $b^2$ a cam-shaft, lifting devices thereon, a shaft K driven from the shaft of said disk J, an irregular cam and a weight on said cam-shaft an inclined drop or swing shaft having a driving-connection at one end with said shaft K and communicating motion to said cam-shaft, drive-chains for operatively connecting the shaft K and the actuating shaft of the spindle devices, a drop rail N swung from the main-frame and carrying the spindle devices, a clutch and a presser-lever device which engages said cam, to suit the desired cant for varying the angle of the rail of the spindle in the formation of the ball, substantially as herein set forth.

4. In a balling-machine, the combination with the main-frame, rotary-flier, an automatic stop mechanism, and suitable variable-speed driving-mechanism, of a drop-rail N swung on axes from the said main-frame, a spindle journaled in said rail, spindle actuating-devices having a flexible connection with the main-frame and said driving-mechanism, a presser-arm and clutch-device on said rock-rail operated by the ball as it comes to size, a trip canting-lever, one end of which engages said clutch-device and the other an irregular, rotating cam on the main-frame, said cam, and a spur-gear on said spindle actuating-devices, said rail N, on the ball coming to size and the release of its said clutch-device, dropping, to bring the spindle into the final ball-covering position and the spur-gear into engagement with the automatic stop-mechanism, substantially as herein set forth.

5. In a balling-machine, an automatic stop-mechanism composed of a shaft having a pair of disks each armed with a lateral pin or projection, a spur-gear and a weighted pulley or drum also on said shaft, a shaft H provided with a worm gear, and carrying a cam $H^2$, an inclined drop-shaft having a worm engaging the worm gear of shaft H, a driven disk J, and controlling mechanism between the disk J and the shaft H, a slotted-plate supporting said drop-shaft and armed with hooked-lug M, $m$, a spring-projected shaft C, a dog $D^2$ engaging therewith, the shaft being suitably connected with the driving clutch-lever or other power stopping and starting devices, lever G having an extension $g^2$, and a spindle drop-rail N having a rotating spur-gear which engages said spur-gear on the disk-shaft, substantially in the manner and for the purpose herein set forth.

6. In a balling-machine provided with a drop rail N carrying the spindle devices, the combination, in an automatic clutch-throwing mechanism therefor, of a rotating cam on the main frame of the machine, a crank-arm R, R', having an adjusting-arm device $R^3$, $R^4$, $R^5$, $r^5$ to suit the size of ball desired, a presser-shaft Q' connected at its inner end to said crank-arm and having a grip or clutch Q at its outer end, and a trip-lever $Q^2$ engaged by said clutch Q and bearing at its lower end against said rotating cam on the main-frame of the machine, whereby, when a ball comes to size and is ready for the final layer or cover of twine, the said crank-arm is forced outward owing to the increasing diameter of the ball and the clutch-lever released, for the dropping-action of said rail N, substantially as herein set forth.

7. In a balling-machine, the combination with the variable-speed driven-disk J feathered on an upright shaft, of lifting and dropping or reciprocating devices therefor, composed of a cross-beam coupled to said disk, vertical side-bars projecting upwardly from said cross-beam, suitable guide-ways on the main-frame, the cam-shaft journaled in said frame, and provided with winding-drums, lifting-chains or flexible connections leading from said drums to the upper ends of said disk side-bars, a suitable drop worm, a winding weight, and a worm-gear also on the said cam-shaft, said worm-gear meshing with said drop-worm, and the whole being constructed, arranged and adapted to operate substantially in the manner and for the purpose specified.

8. In a balling-machine, the combination with the stop-motion disk-shaft E, clutch-throwing shaft $c$, $c^4$, and dog $D^2$, of a rock trip-arm D, D', and a gravitating-arm B' having a twine guide-pulley A', and a lower-extension $A^2$, the latter dropping on the said trip-arm to disengage said dog from said shaft C, to automatically throw the clutch or other similar device and thereby instantly shut off the motive power from the machine, in case the twine breaks or the supply-bobbin becomes spent before a ball is complete, substantially as herein set forth.

9. In a balling-machine, the combination with the main-frame and a shaft H, of an irregular-cam mounted on said shaft adjacent one side-frame, a lug on the inner face or back of said cam, and a stop or gage detachably and adjustably set on said side of the frame, to form an abutment for the back movement of said cam and determine the desired starting-point at which the cam begins rotating in connection with the spindle-devices, and thereby make due provision for the kind of twine or other material balled, substantially as herein set forth.

10. In a balling-machine, the combination with a winding-spindle having an arbor $n$ running freely in a suitable bearing or box, a hubbed bevel-gear or other driving-wheel $n^3$ mounted loose on said arbor, a ratchet collar or ring $N^2$ keyed to said arbor adjacent said bevel-gear, and a spring-controlled pawl $N^3$ mounted on said bevel-gear and engaging the teeth of said ratchet, whereby the spindle is coupled with said bevel-gear for the forward winding-movement, and adapted to be turned ahead, free from said bevel-gear, in case the twine breaks or runs out before a ball is complete, and resetting the spindle with its unfinished ball in proper relation with the flier-legs where the break occurred, substantially as herein set forth.

11. In a balling-machine, a turn table or turret for holding one or more bobbins filled with twine for supplying the balling spindle, composed of a revoluble base T, a series of pairs of upright-bearings T', suitable shafts $t$, mounted in said bearings and adapted to receive the bobbins, and a suitable brake-device $t'$, $t^2$, $t^3$, V, $T^3$, the whole being mounted on the main-frame or other place convenient to the machine, and provided with a suitable latch-device W engaging sockets W' in the turn-table, substantially as herein set forth.

In testimony of which invention we have hereunto set our hands.

ALEXANDER BLACKIE.
CHARLES WELLS SHARTLE.

Witnesses:
JOHN E. JONES,
L. M. JONES.